Jan. 9, 1962 A. E. RINEER 3,016,021
FLUID POWER CONVERTER
Filed July 24, 1958 2 Sheets-Sheet 1
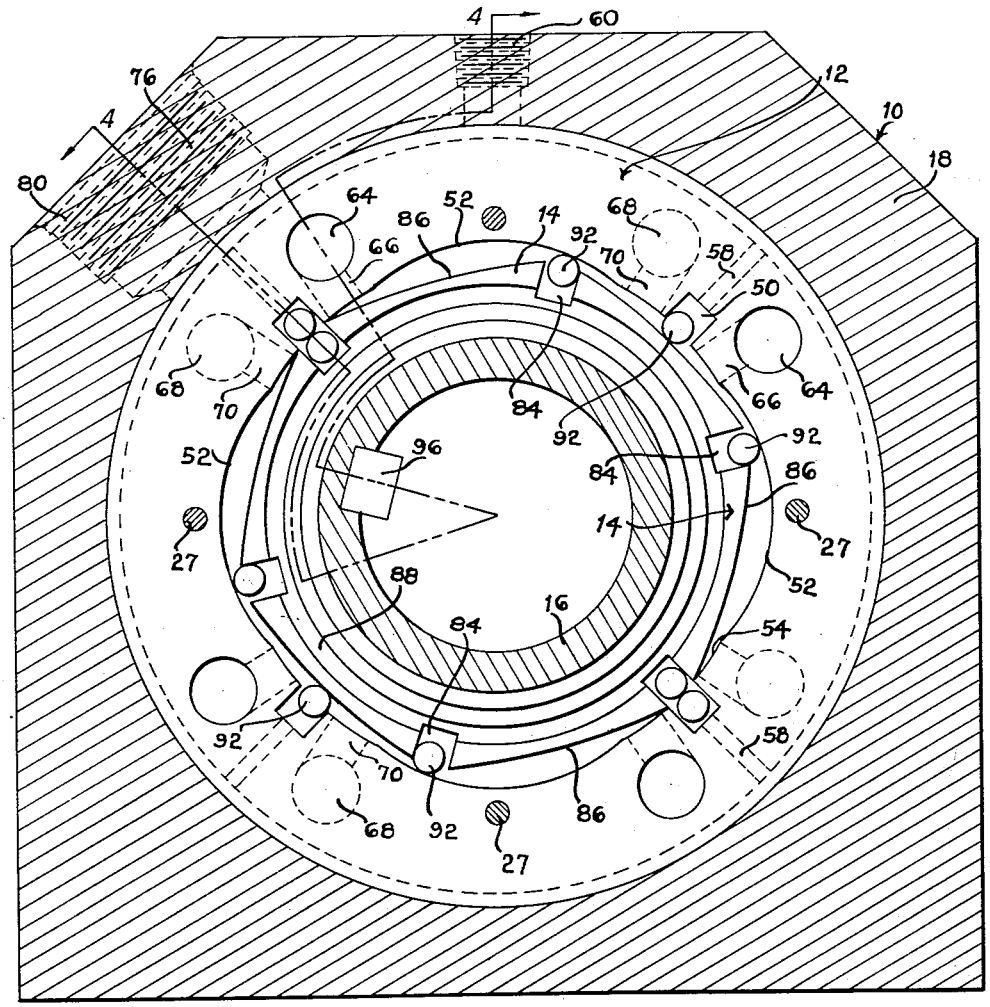
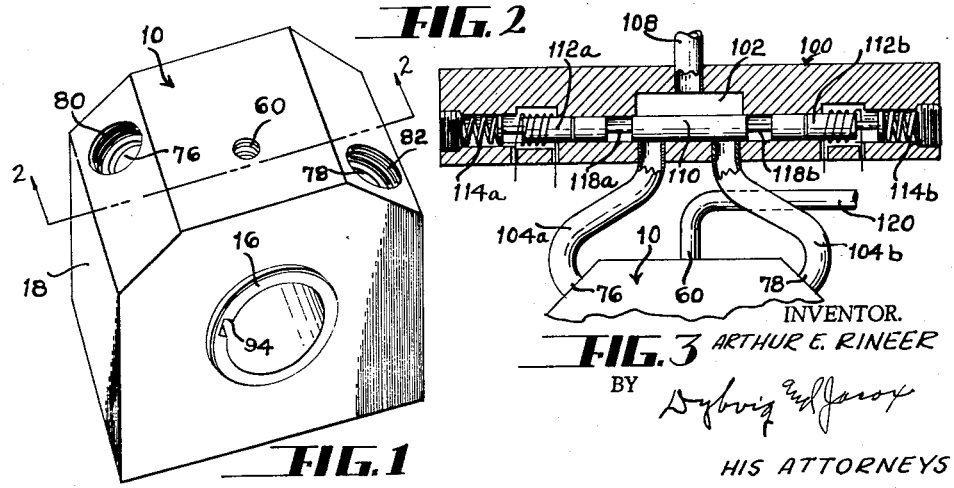
FIG. 1 FIG. 2 FIG. 3
INVENTOR.
ARTHUR E. RINEER
BY
HIS ATTORNEYS Jan. 9, 1962 A. E. RINEER 3,016,021
FLUID POWER CONVERTER
Filed July 24, 1958 2 Sheets-Sheet 2

INVENTOR.
ARTHUR E. RINEER
BY
HIS ATTORNEYS

United States Patent Office 3,016,021
Patented Jan. 9, 1962

3,016,021
FLUID POWER CONVERTER
Arthur E. Rineer, 41 East Drive, Centerville, Ohio
Filed July 24, 1958, Ser. No. 750,751
9 Claims. (Cl. 103—123)

This invention relates to a fluid power converter wherein power from a fluid under pressure may be converted to mechanical power and vice versa, and more particularly to improvements in my copending application, Serial No. 640,918, filed February 18, 1957 for Fluid Power Converter, of which this application forms a continuation-in-part.

An object of this invention is the provision of a rotary fluid power converter provided with new and improved internal fluid circuitry enabling the power converter to be shifted from an operative to a nonoperative condition and vice versa solely through manipulation of the fluid circuits leading to the power converter.

Another object of this invention is the provision of a novel fluid motor and associated control circuitry, the motor being selectively operable in reversed directions without alteration or interruption of the fluid input to the motor.

A further object of this invention is the provision of an assembly for the conversion of fluid power to mechanical power including a fluid motor provided with a single fluid inlet and dual fluid outlets in combination with a control valve for selectively closing one of the dual outlets as a means of controlling the direction of operation of the fluid motor.

Other objects and advantages reside in the construction of parts, the combination thereof, the method of manufacture and the mode of operation, as will become more apparent from the following description.

In the drawings, FIGURE 1 is a perspective view of the fluid power converter of this invention.

FIGURE 2 is an enlarged sectional view taken substantially along the line 2—2 of FIGURE 1.

FIGURE 3 is a fragmentary schematic view illustrating in sectional detail a control valve operatively connected with the fluid power converter.

Figure 4:
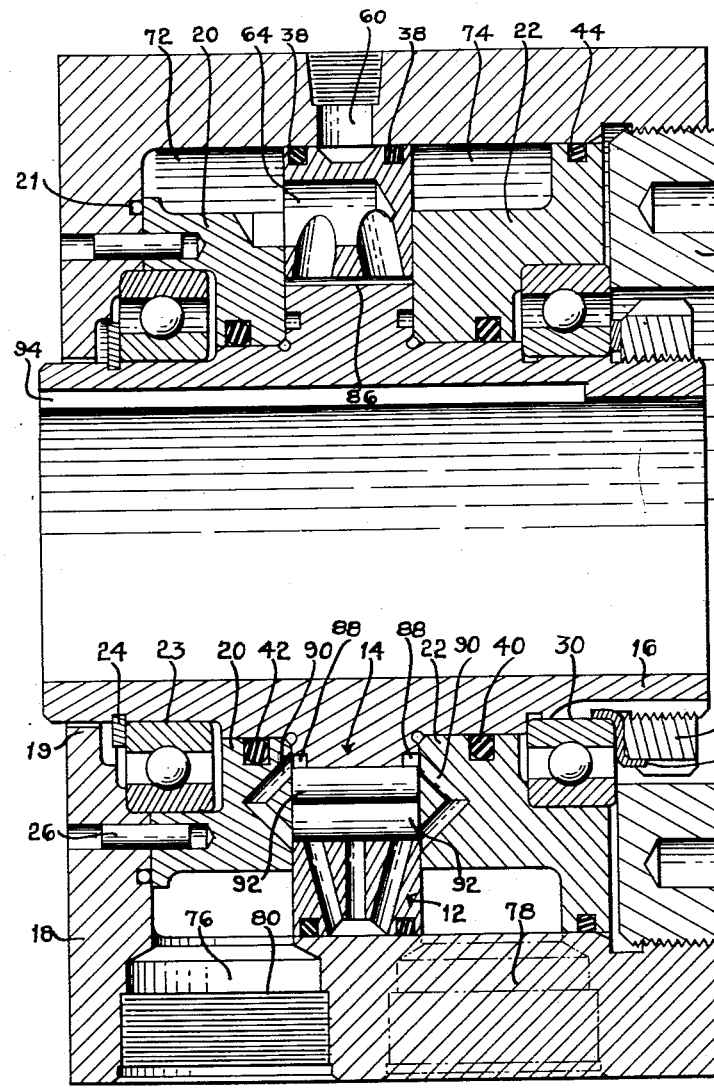
FIGURE 4 is a sectional view taken substantially along the line 4—4 of FIGURE 2.

Referring to the drawings in detail, the internal structure of the fluid power converter 10 of FIGURE 1 is best illustrated in FIGURES 2 and 4. The torque transmitting elements of the fluid power converter are a stator 12 and a rotor 14, the latter being encircled by the former. As best illustrated in FIGURE 4, the rotor 14 is integral with a tubular shaft 16. This shaft is provided with a key way 94 adapted to receive a key 96 for attachment to a driven, or a driving, apparatus. The power converter is assembled upon this shaft 16.

In assembling the power converter an annular ring 20, hereinafter referred to as a manifold element, provided with an internally seated O-ring 42 is projected over one end of the tubular shaft 16 against one side of the rotor 14. The manifold element 20 is supported rotatably upon the shaft 16 by means of a roller bearing 23 retained on the shaft 16 by a snap ring 24 seated in an annular groove in the shaft 16.

With the manifold element 20 thus secured to the shaft 16, a cup-shaped housing 18 having an apertured base portion 19 is projected concentrically over the shaft 16 with the base 19 abutted against the manifold element 20. An O-ring 21, recessed in the base portion 19 opposite the manifold element 20, provides a fluid seal between these elements. The housing 18 is nonrotatably secured to the manifold element 20 by means of pins 26.

With the housing 18 in place, the annular stator element 12, which is provided with externally grooved O-rings 38, is slid into the housing 18 in opposing concentric relation to the rotor 14. Next, a second annular manifold element 22 provided with internally and externally grooved O-rings 40 and 44, respectively, is slid into the housing 18 into abutment with the annular stator 12. The manifold element 22 is supported for rotation with respect to the shaft 16 by a roller bearing 30.

The open end of the housing 18 is threaded to receive an externally threaded annular ring 32 adapted to clamp against the outer race of the roller bearing 30. Tightening of the ring 32 serves to draw the manifold elements 20 and 22 and the stator 12 into a tight sandwich. Thus, the entire assembly including the housing 18, the manifold elements 20 and 22, the stator 12 and the ring 32 is supported by the roller bearings 23 and 30 for rotation upon the shaft 16. As viewed in FIGURE 4, the right end of the shaft 16 is threaded to receive a nut 34 which is tightened upon a lock washer 36 to take up any axial play of the stator assembly relative to the shaft 16.

Figure 5:
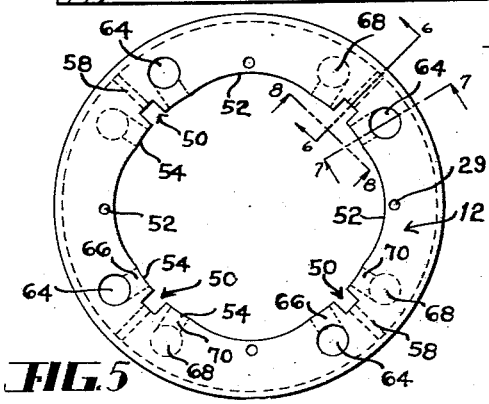
FIGURE 5 is a plan view of the stator element of the power converter drawn to reduced scale.

Pins 27, best seen in FIGURE 2, positioned in holes 29 in the stator 12, best seen in FIGURE 5, engage corresponding holes, not illustrated, in the manifold element 20 to secure the stator 12 nonrotatably to the manifold element 20. Like pins, not illustrated, secure the manifold element 22 nonrotatably to the stator 12. These pins together with the pins 26 securing the manifold element 20 nonrotatably to the housing 18 serve to anchor the housing 18, the manifold elements 20 and 22, and the stator 12 in fixed registry.

The construction of the stator 12 is best illustrated in FIGURES 5 through 8. Referring to FIGURE 5, the inner periphery of the stator 12 is divided into four like sectors 52 by means of four equispaced channels 50. On either side of each channel 50 the stator is cut on a radius, defined as the pitch radius, to provide lands 54 flanking the channels 50. Between adjacent lands 54 each sector 52 of the inner periphery of the stator is cut on a radius substantially less than the pitch radius, such that the sectors 52 are indented or recessed.

Figure 6:
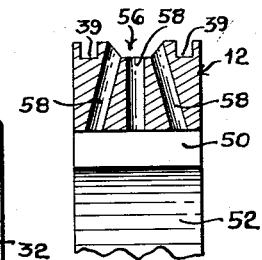
FIGURE 6 is a fragmentary enlarged sectional view taken substantially along the line 6—6 of FIGURE 5.
Figure 7:
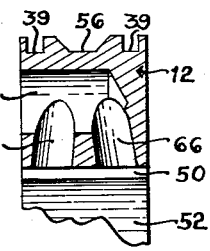
FIGURE 7 is a fragmentary enlarged sectional view taken substantially along the line 7—7 of FIGURE 5.
Figure 8:
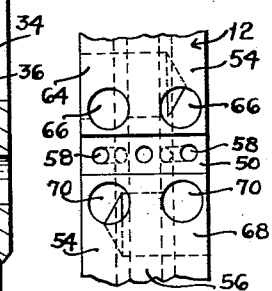
FIGURE 8 is an enlarged fragmentary plan view taken in the direction indicated by the line 8—8 of FIGURE 5.

Referring to FIGURES 6 and 7, the outer periphery of the stator 12 is provided with three spaced annular grooves. Adjacent each end of the stator 12 an annular groove 39 is provided for receiving the O-rings 38. Between the grooves 39 a groove 56 encircles the stator 12. Three radially disposed ports 58, as best seen in FIGURE 6, connect each channel 50 with the annular groove 56. As best illustrated in FIGURE 4, the annular groove 56 of the stator communicates with a port 60 in the housing 18. The port 60 is internally threaded for receipt of a suitable fitting.

As best illustrated in FIGURES 5 and 7, four equispaced borings 64 extend axially into the body of the stator 12 from one side thereof. A pair of ports 66 connects each of the borings 64 to the inner periphery of the stator 12. The ports 66 open to the inner periphery of the stator 12 through one of the lands 54 disposed to one side of each of the channels 50. Similar borings 68 entering the body of the stator 12 from the opposite side connect through ports 70 to the land 54 on the other side of each of the channels 50.

In the assembled power converter, as illustrated in FIGURE 4, each of the borings 64 in the stator 12 communicates with an annular manifold 72 provided in the power converter between the inner wall of the housing 18 and the outer margin of the manifold element 20. Similarly, each of the borings 68 in the stator 12 communicates with an annular manifold 74 provided in the fluid power converter between the inner wall of the housing 18 and the outer margin of the manifold element 22. The manifold 72 connects to a port 76 in the housing 18 which is internally threaded, as illustrated at 80, for receipt of a suitable fitting. The manifold 74 connects to a port 78 in the housing 18 which is internally threaded, as illustrated at 82, for receipt of a suitable fitting.

From the foregoing description, it is evident that the power converter is provided with three separate fluid circuits. The first of these circuits, hereinafter designated a control circuit, extends from the port 60 in the housing 18 through the manifolding groove 56 in the stator 12, through the ports 58 to the channels 50 of the stator 12. The second circuit extends from the port 76 through the manifold 72, through the borings 64 in the stator 12, through the ports 66 to the inner periphery of the stator 12 on one side of each channel 50 therein. The third circuit extends from the port 78 in the housing 18 through the manifold 74, through the borings 68 in the stator 12, through the ports 70 to the inner periphery of the stator 12 to the other side of each of the channels therein. The alignment of the ports 58, 66 and 70, through which these three separate circuits open to the inner periphery of the stator 12, is best observed in FIGURE 8.

The construction of the rotor 14 is best illustrated in FIGURE 2. At a fixed radius on the outer periphery of the rotor, six equispaced channels 84 are provided. These channels 84 open to the interspace between the rotor and the stator at substantially the same radius at which the channels 50 of the stator open to this interspace. As noted hereinbefore, this radius is termed the pitch radius. Between each of the channels 84 in the rotor 14, the periphery of the rotor is cut on a radius exceeding the pitch radius, with the result that the rotor surfaces 86 between adjacent channels 84 are indented or recessed. The arrangement is such that the rotor 14 may rotate within the stator 12, there being a slight clearance provided between the outer margins of the channels 84 in the rotor and the lands 54 in the stator. The line of separation between the rotor and stator is at the pitch radius.

The six channels 84 in the rotor are interconnected by annular grooves 88 disposed in both sides of the rotor. Ports 90, illustrated in FIGURE 4, in the body of the manifold elements 20 and 22 connect the annular grooves 88 of the rotor with the channels 50 in the stator. That is, each of the channels 50 in the stator connects through ports 90 in the manifold elements 20 and 22 to the annular grooves 88 in the rotor, with the result that the channels 50 in the stator and the channels 84 in the rotor are always in communication. It is to be noted that the communication between the channels 50 and the channels 84 extends from the bases of the channels 50 to the bases of the channels 84.

As illustrated in FIGURES 2 and 4, a roller or abutment 92 having a length equal substantially to the width of the rotor and stator elements 14 and 12, respectively, is positioned in each of the channels 50 of the stator and in each of the channels 84 of the rotor. The ends of these rollers 92 wipe over the faces of the manifold elements 20 and 22 which are butted against the sides of the rotor and stator and which serve to close off the annular inner space between the rotor and the stator. The diameter of the rollers 92 is less than the width of the channels 50 and 84 of the stator and rotor, respectively. In relation to the diameter of the rollers 92, the contouring of the inner periphery of the stator 12 is such that the maximum departure of the stator sectors 52 from the pitch radius, and the maximum departure of the rotor surfaces 86 from the pitch radius, is less than the radius of the rollers 92. As a consequence of this construction, the rollers 92 are trapped within their respective channels 50 and 84 and can move at most half way out of their respective channels.

The fluid power converter of this invention may be caused to operate in several different modes, depending upon the manner in which the three separate fluid circuits of the power converter are connected. Several different types of connections are described in the following.

In one type of operation, the port 60 in the housing 18 for the power converter is plugged shut. Either of the ports 76 or 78 is used as a fluid inlet, with the other of the ports being used as a fluid outlet. As one example, assume the port 76 is the inlet and the port 78 is the outlet. Assume further, that the fluid employed is an incompressible fluid, such as water.

With this type of connection, the device will operate either as a motor or a pump, depending whether hydraulic power is supplied to the unit through the port 76, or mechanical power is supplied by rotating the rotor relative to the stator. In operation as a motor, fluid under pressure flows through the port 76, to the manifold 72, to the borings 64 in the stator 12, through the ports 66 in the stator 12, to the interspace between the rotor and the stator. Once in this interspace, the hydraulic fluid will tend to flow in the counterclockwise direction, as viewed in FIGURE 2, across the channels 50 in the stator to the ports 70 of the fluid outlet circuit. This initial flow will establish a venturi effect across each of the channels 50 drawing the rollers 92 therein against the rotor surfaces, thereby cutting off the counterclockwise flow of fluid in the power converter. In a similar manner, clockwise flow of the fluid in the power converter will be interrupted by movement of the rollers 92 in the channels 84 in the rotor into contact with the opposing stator surfaces. As the rollers 92 move into operative positions the fluid entering the power converter fills the third fluid circuit of the power converter which has been plugged at the port 60.

The rollers 92, when seated in operative positions, divide the interspace between the rotor and stator into a plurality of chambers. Those chambers in communication with the inlet ports 66 are subjected to the inlet fluid pressure, which tends to drive the rotor of the power converter in a clockwise direction as viewed in FIGURE 2. When the pressure in the inlet ports 66 has risen sufficiently that the torque delivered to the rotor overcomes any load on the rotor, the rotor will rotate relative to the stator in the clockwise direction as viewed in FIGURE 2. As the rotor rotates, those chambers which were initially in communication with the fluid inlet ports 66 eventually are brought into communication with the fluid outlet ports 70, the rollers in the rotor cooperating with the rollers in the stator to squeeze the fluid out of these chambers into the fluid outlet circuit. As the rotor and stator undergo relative rotation, the rollers 92 wipe the rotor and stator surfaces, dropping into their respective channels on passing one over the other.

Under this type of operation the fluid power converter operates as if the third fluid circuit which has been stopped up were not present. The operating characteristics of the fluid power converter under this type of connection are discussed in greater detail in my copending application Serial No. 595,372, filed July 2, 1956, now Patent No. 2,992,616, and entitled Fluid Power Converter. Clearly, if the fluid inlet were changed from the port 76 to the port 78, the rotor of the fluid power converter would be driven in the reverse or counterclockwise direction, as viewed in FIGURE 3.

If, instead of supplying fluid under pressure to the power converter, the rotor of the power converter is driven mechanically in the clockwise direction as viewed in FIGURE 2, and if the fluid port 76 is placed in communication with a suitable fluid reservoir, the power converter 10 will operate to pump fluid from the reservoir through the port 78. Conversely, if the rotor is driven in the counterclockwise direction as viewed in FIGURE 2, and if the port 78 is placed in communication with a reservoir, the fluid power converter 10 will operate as a pump pumping fluid from the reservoir through the port 76. This type of operation is also discussed more fully in the above identified copending application.

Operation of the fluid power converter as a pump with this type of connection requires that a sufficient venturi effect is created between the rotor and a stator to actuate the rollers 92 of these members. With liquids of comparatively low viscosity such as water, a sufficient venturi effect can be created. With liquids with higher viscosity, such as oils, and with gases, however, artificial means must be employed for actuating the rollers 92 of the power converter to operative positions.

The fluid circuit of the port 60 supplies one means for artificially actuating the rollers 92. Clearly, when one of the ports 76 or 78 is connected to a fluid exhaust and fluid under pressure is introduced in the port 60, there will be a movement of fluid from the port 60 to the exhaust circuit around the rollers 92. As a consequence, the rollers 92 will move with the fluid into the interspace between the rotor and stator into operative positions. Conversely, a flow of fluid from either of the ports 76 or 78 through the circuit of the port 60 will draw the rollers 92 into their respective channels to nonoperative positions.

As an example the power converter may be used as a motor, there being a high pressure inlet to the port 76 and a low pressure exhaust from the port 78. Upon the introduction of fluid under pressure in the port 76, a portion of the fluid will make its way to the outlet ports 70 while another portion of the fluid will make its way around the rollers 92 into the trigger circuit to the port 60. This flow of fluid into the control circuit will draw the rollers 92 into their respective channels, such that the power converter will not be able to function as a motor. However, if the port 60 is connected with a source of fluid under pressure, the flow of fluid into the control circuit may be reversed, whereupon the rollers 92 will be drawn into operative positions by the fluid flow, the power converter then operating as a motor. Thereafter, the pressure in the control circuit may be reduced to equivalency with that of the inlet circuit.

While the power converter, connected as described, is operating as a motor, there is no net fluid flow in the control circuit and, except for pulsations in the control circuit due to the movement of the rollers 92 into and out of their respective channels as they pass one over the other, the control circuit is static. If at any time the pressure in the control circuit is reduced, as by permitting the port 60 to exhaust, the rollers 92 will immediately move into their respective channels and the power converter will shift into a free wheeling or coasting condition. The power converter will remain inoperative until pressure is restored in the control circuit. It is thus apparent that when the power converter is operating as a motor, the control circuit may be employed to stop and start power transmission.

Analogously, when the power converter is operated as a pump, the control circuit associated with the port 60 may be used to start and stop the pumping action. As one example, assume that the port 76 is connected to a fluid reservoir and that fluid is to be pumped out of the port 78. If, while supplying the mechanical power to the rotor for the power converter, fluid under pressure is briefly supplied to the control circuit through the port 60, the rollers 92 will be actuated into operative positions, and the power converter will commence operation as a pump. The operation as a pump will continue so long as the control circuit is maintained under pressure either by continuously supplying pressure to the port 60 or by plugging up the port 60. As was the case with the motor operation described above, the control circuit is static, that is, there is no net flow of fluid through the control circuit as the power converter is pumping.

If, while the power converter is operating as a pump, the pressure in the control circuit is reduced, the rollers 92 will move into their respective channels to thereupon render the power converter inoperative as a pump. The power converter will remain inoperative until pressure is once again restored to the control circuit.

In the foregoing the use of the circuit associated with the port 60 of the power converter for regulating the operation of the power converter as a pump and as a motor has been described. In the above examples, when the power converter is operated as a motor and it is desired to reverse direction of rotation of the motor, it is necessary to interchange the fluid inlet and outlet. In the following, a circuit connection enabling reversible operation of the power converter without interchange of inlet and outlet connections is described.

For reversible operation of the fluid power converter as a motor, fluid under pressure is introduced through the port 60, such that the fluid flows into the interspace between the rotor and stator of the power converter through the bases of the channels 50 and 84 and around the rollers 92 therein. This fluid flow actuates the rollers 92 into operative positions. If the port 76 of the power converter is plugged, the fluid will exhaust through the ports 70 and the stator rollers 92 will move to the counterclockwise sides of their respective channels to cut off a direct leakage of fluid to the ports 70. In consequence of this movement, the fluid flows on the clockwise side of each stator roller. Correspondingly, the rotor rollers 92 move to the clockwise sides of their respective channels to cut off direct leakage of fluid to the ports 70 whereby the inlet fluid from the rotor channels flows on the counterclockwise side of each rotor roller. With this positioning of the rollers, the inlet fluid reacts with the rollers to drive the rotor of the power converter in the clockwise direction as viewed in FIGURE 2. If on the other hand, the port 78 is plugged, the fluid will exhaust through the port 76 and, due to the change in the location of the fluid outlets, the rollers 92 in both the rotor and stator shift to the opposite sides of their respective channels so as to cut off direct leakage of inlet fluid to the new outlet ports 66. With this shift in the positions of the rollers 92, the inlet fluid now reacts with the rollers to drive the rotor of the power converter in the counterclockwise direction.

FIGURE 3 illustrates the power converter 10 connected for reversible operation in association with a control valve 100. The control valve 100 is provided with a fluid receiving cavity 102 which connects with fluid inlet conduits 104a and 104b and with a fluid exhaust conduit 108. The conduits 104a and b connect to the ports 76 and 78 of the power converter 10, respectively, to form dual exhausts.

A spool valve 110, mounted for reciprocal axial movement obstructs the passage of fluid from the conduits 104a and b into the receiving cavity 102. Solenoids 112a and 112b, cooperating with springs 114a and 114b at the opposite ends of the spool valve 110, position the spool valve.

When both solenoids 112a and 112b are deenergized, the springs 114a and 114b center the spool valve 110 in the cavity 102 such that the spool valve plugs both the conduits 104a and 104b. Energization of the solenoid 112a compresses the spring 114a, and in consequence, the spring 114b will drive the spool valve 110 to the left as viewed in FIGURE 2, aligning a groove 118b in the spool valve with the conduit 104b. This opens the conduit 104b while the conduit 104a remains closed. Conversely, if the solenoid 112a is deenergized and the solenoid 112b is energized, the spool valve 110 is shifted to the right, as viewed in FIGURE 3, to align a groove 118a in the spool valve with the conduit 104a. Thus, the control valve 100 has three positions, one wherein both the conduits 104a and b are closed, another wherein only the conduit 104a is closed, and a third wherein only the conduit 104b is closed.

The power converter when regulated by the control valve 100 operates as follows. Referring to FIGURE 3 a fluid inlet conduit 120 is connected to the port 60 of the power converter for the purpose of supplying fluid under pressure to the power converter. With both solenoids 112a and 112b deenergized, the fluid power converter is held inoperative by the control valve 100 even though fluid under pressure is being supplied to the power converter. Upon energization of the solenoid 112a the power converter will operate in the clockwise direction. Upon energization of the solenoid 112b the power converter will operate in the counterclockwise direction. This type of motor operation has the advantage that reversal of the direction of rotation of the rotor may be accomplished without change in the general direction of fluid flow through the inlet to the power converter. This makes possible extremely rapid reversal of the torque applied to the rotor.

In the foregoing, three basic modes of operation of a power converter embodying the novel fluid circuitry described herein have been described. It is to be understood that these modes of operation are adhered to only at comparatively low speeds and fluid pressures. At high operating speeds and pressures, the operating characteristics are not so easily predictable and many more factors than have been discussed herein must be considered. It will also occur to those skilled in the art that novel operating characteristics other than those discussed herein may be obtained.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A fluid power converter comprising, in combination, a stator and a rotor mounted one within the other for relative rotation, the relation of one to the other being such as to provide contiguous chambers therebetween, said stator being provided with a plurality of equispaced channels adjacent said rotor, abutments floatably disposed in said channels, said abutments being engageable with said rotor to partition said chambers and to react with fluid therein, means providing a fluid inlet conduit passing into said stator and communicating with each said channel behind the abutment therein, there being clearance between the abutments and the walls of said channels for fluid flow from said inlet conduit to said chambers, means providing a first fluid outlet conduit communicating with said chambers at one side of each said channel, means providing a second fluid outlet conduit communicating with said chambers at the other side of each said channel, said first and second outlet conduits communicating with the exterior of said power converter to convey fluid from said chambers, and means to selectively close one of said outlet conduits whereby fluid flowing from said inlet conduit to the other of said outlet conduits reacts with said abutments to induce rotation of said rotor, the direction of rotation of said rotor being dependent upon which of said outlet conduits is selectively closed.

2. A fluid power converter comprising, in combination, first and second substantially cylindrical members mounted concentrically for rotation one with respect to the other about their common axis, there being an annular space therebetween, means enclosing the ends of said members to prevent escape of fluid from said annular space, said first member being provided with a contoured periphery cooperating with an opposing periphery of said second member to establish chambers in said annular space, said second member having a plurality of equispaced axially extending channels in the periphery thereof opening to said annular space, a plurality of axially extending rollers, there being one roller floatably disposed in each said channel, said rollers being freely movable radially to engage the opposing contoured surface of said first member to thereby partition said annular space and react with fluid therein, means providing a fluid inlet conduit in said second member opening to the base of each said channel, there being a clearance between said rollers and the walls of said channels for fluid flow from said inlet to said annular space, means providing a first fluid outlet conduit in said second member opening to said annular space adjacent one side of each said channel, means providing a second fluid outlet conduit in said second member opening to said annular space adjacent the other side of each said channel, and means to selectively close either of said first and second outlet conduits whereby fluid introduced in said power converter through said fluid inlet flows to the other of said outlet conduits, the fluid thus flowing reacting with said rollers to induce rotation of said first member, the direction of rotation of said first member being dependent upon which of said fluid outlets is closed.

3. A fluid power converter comprising a rotor member and a stator member, one of said members being journalled within the other with an annular space therebetween, the members being concentrically mounted and rotatable one with respect to the other, means enclosing the ends of said members to prevent escape of fluid from said annular space, said members having opposing contoured surfaces cooperating to establish chambers in said annular space, said contoured surfaces being substantially cylindrical surfaces each provided with a plurality of equispaced axially extending channels and a recessed portion intermediate each pair of adjacent channels, the number of channels and recessed portions in said rotor member exceeding the number of channels and recessed portions in said stator member, a plurality of abutments, there being one abutment floatingly positioned in each said channel and freely movable into said annular space to react with fluid therein, means providing a fluid inlet conduit to said stator member communicating with the base of each channel therein, there being clearance between said abutments and the walls of said channels for fluid flow from said inlet conduit to said annular space, means providing a first outlet conduit in said stator member communicating with said annular space adjacent one side of each channel therein, means providing a second outlet conduit in said stator member communicating with said annular space adjacent the other side of each channel therein, means to selectively close either of said first and second outlet conduits whereby fluid entering said annular space from said fluid inlet conduit is caused to flow to the other of said outlet conduits, such fluid reacting with said abutments to induce rotation of said rotor member as it flows toward the other outlet conduit, the direction of rotation of said rotor member being determined by which of said outlet conduits is closed.

4. The fluid power converter according to claim 3 including means providing fluid passages placing the channels of said rotor member in communication with the channels of said stator member.

5. The combination with a fluid power converter comprising a rotor member and a stator member, one of said members being journalled within the other with an annular space therebetween, the members being concentrically mounted and rotatable one with respect to the other about their common axis, means enclosing the ends of said members to prevent escape of fluid from said annular space, said rotor member being provided with a contoured periphery cooperating with the opposing periphery of said stator member to establish chambers in said annular space, said stator member having a plurality of equispaced axially extending channels in the periphery thereof opening to said annular space, a plurality of axially extending abutments, there being one abutment floatably disposed in each said channel, said abutments being freely movable radially to engage the opposing contoured surface of said rotor member to thereby partition said annular space and react with fluid therein, means providing a first fluid outlet conduit in said stator member opening to said annular space adjacent one side of each said channel, means providing a second fluid outlet conduit in said stator member opening to said annular space adjacent the other side of each said channel, means providing a fluid inlet conduit leading to said stator member and opening to the base of each channel therein, there being clearance between said abutments and said channels for fluid flow between said inlet conduit and said annular space, and means connecting said fluid inlet and outlet conduits separately to the exterior of said power converter, of valve means for selectively closing either one of said outlet conduits whereby the fluid flowing from said inlet conduit to the other of said outlet conduits reacts with said abutments to induce rotation of said rotor, the direction of rotation being dependent upon which of said outlets is closed.

6. A fluid power converter assembly comprising a rotor and a stator, one of said members being journalled within the other, the members being concentrically mounted and rotatable one with respect to the other about their common axis, said members having opposing contoured surfaces cooperating to provide an annular space therebetween, means enclosing the ends of said members to prevent escape of fluid from said annular space, each of said contoured surfaces being provided with a plurality of equispaced axially extending channels and with recessed portions intermediate each pair of adjacent channels, said recessed portions establishing chambers in said annular space, the number of channels and recessed portions in said rotor exceeding the number of channels and recessed portions in said stator, a plurality of abutments for partitioning said annular space and for reacting with fluid therein, there being one abutment floatingly positioned in each said channel, means providing a first fluid outlet from said stator communicating with said annular space adjacent one side of each channel therein, means providing a second fluid outlet from said stator communicating with said annular space adjacent the other side of each channel therein, means providing a fluid inlet leading to said stator and communicating with the base of each channel therein, there being clearance between the walls of said channels and said abutments for fluid flow between said fluid inlet and said annular space, means connecting said inlet and said outlets to the exterior of said power converter, and valve means for selectively closing one of said outlets whereby the fluid flowing from said inlet to the other of said outlets reacts with said abutments to induce rotation of said rotor, the direction of rotation being dependent upon which of said outlets is closed.

7. A fluid power converter comprising, in combination, a stator member and a rotor member mounted for rotation one with respect to the other, there being a fluid chamber therebetween, means closing the ends of said members to prevent escape of fluid from said fluid chamber, an abutment for partitioning said chamber, means providing a channel in one of said members slideably receiving said abutment, said abutment being movable slideably into said chamber to react with fluid therein, means providing first and second fluid outlet conduits in said one member communicating with said chamber on opposite sides of said abutment for conveying fluid from said chamber, and means providing a separate fluid inlet passage leading from the exterior of said power converter to said channel behind the abutment therein, there being clearance between the walls of said channel and said abutment for fluid flow from said inlet passage to said chamber, the construction and arrangement being such that, upon closure of either of said fluid outlet conduits, fluid under pressure introduced to said chamber through said inlet reacts with said abutment to induce rotation of said rotor member, the direction of rotation of said rotor member being dependent on which of said outlet conduits is closed.

8. A fluid power converter comprising, in combination, first and second substantially cylindrical members mounted concentrically for rotation one with respect to the other about their common axis, there being an annular fluid chamber between the opposing surfaces of said members, means enclosing the ends of said members to prevent escape of fluid from said chamber, said first member having a plurality of equispaced, axially extending channels in the periphery thereof opening to said chamber, a plurality of axially extending abutments, there being one abutment floatably disposed in each said channel, said abutments being freely movable radially to engage the opposing surface of said second member to thereby partition said chamber and react with fluid therein, means providing a fluid outlet conduit communicating with said chamber adjacent one side of each said channel, and means providing a fluid inlet conduit leading from the exterior of said power converter to the base of each said channel, said inlet conduits constituting the sole inlets to said chamber, there being clearance between said abutments and the walls of said channels for fluid flow to said chamber from said inlet conduit, said fluid reacting with said abutments to induce rotation of said second member.

9. A fluid power converter comprising, in combination, a stator member and a rotor member mounted for rotation one with respect to the other, there being a fluid chamber therebetween, means enclosing said members to prevent escape of fluid from said chamber, an abutment for partitioning said chamber, means providing a channel in one of said members slideably receiving said abutment, said abutment being movable slideably into said chamber to react with fluid therein, means providing a fluid outlet conduit communicating with said chamber on one side of said abutment, and means providing a separate fluid inlet conduit leading from the exterior of said power converter to said channel behind the abutment therein, said inlet constituting the sole fluid inlet to said chamber, there being clearance between said abutment and the walls of said channel for fluid flow from said fluid inlet conduit to said chamber, said fluid reacting with said abutment to induce rotation of said rotor member.

References Cited in the file of this patent
UNITED STATES PATENTS

| | | |
|---|---|---|
| 678,338 | Harger | July 9, 1901 |
| 762,126 | Bond | June 7, 1904 |
| 807,421 | Dickison | Dec. 12, 1905 |
| 869,397 | Tippett et al. | Oct. 29, 1907 |
| 1,997,184 | Ruehman | Apr. 9, 1935 |
| 2,840,991 | Nisbet | July 1, 1958 |